United States Patent [19]

Kiyota et al.

[11] 4,017,355

[45] Apr. 12, 1977

[54] PROCESS FOR TREATING LATICES

[75] Inventors: Takashi Kiyota; Yoshihiko Araki, both of Yokohama; Hideo Hayashi, Kawasaki, all of Japan

[73] Assignee: Nippon Oil Company Ltd., Tokyo, Japan

[22] Filed: May 3, 1976

[21] Appl. No.: 682,853

Related U.S. Application Data

[63] Continuation-in-part of Ser. No. 513,522, Oct. 10, 1974, abandoned, which is a continuation of Ser. No. 207,799, Dec. 14, 1971, abandoned.

[30] Foreign Application Priority Data

Dec. 18, 1970 Japan .................... 45-113029

[52] U.S. Cl. .................. 159/49; 159/13 C; 159/DIG. 10; 159/DIG. 4; 203/49; 203/89
[51] Int. Cl.² .......................... B01D 1/22
[58] Field of Search ............... 159/13 R, 16 R, 49, 159/DIG. 4, DIG. 10, 13 C; 203/49, 89; 260/94.7

[56] References Cited

UNITED STATES PATENTS

| | | | |
|---|---|---|---|
| 2,069,389 | 2/1937 | Peebles | 159/13 C |
| 2,731,081 | 1/1956 | Mayner | 159/49 |
| 2,753,594 | 7/1956 | Buck | 159/13 C |
| 2,949,447 | 8/1960 | Hawkins et al. | 159/DIG. 10 |
| 3,003,930 | 10/1961 | Pugh et al. | 159/DIG. 10 |
| 3,024,228 | 3/1962 | McLeod | 159/DIG. 10 |
| 3,147,174 | 9/1964 | Cook | 159/47 X |
| 3,240,746 | 3/1966 | Davis | 159/DIG. 10 |
| 3,378,467 | 4/1968 | Colton et al. | 159/DIG. 10 |
| 3,409,515 | 11/1968 | Baird et al. | 159/DIG. 10 |
| 3,620,282 | 11/1971 | Newton | 159/13 C |

*Primary Examiner*—Jack Sofer
*Attorney, Agent, or Firm*—Ostrolenk, Faber, Gerb & Soffen

[57] ABSTRACT

A process for removing unreacted monomers or solvents from synthetic rubber latex or synthetic resin latex comprising bringing said latex into contact with an inert gas fluid at a temperature ranging from 40° to 100° C by feeding said latex into the upper part of a wetted-wall tower without imposing any substantial mechanical shear stress.

7 Claims, 2 Drawing Figures

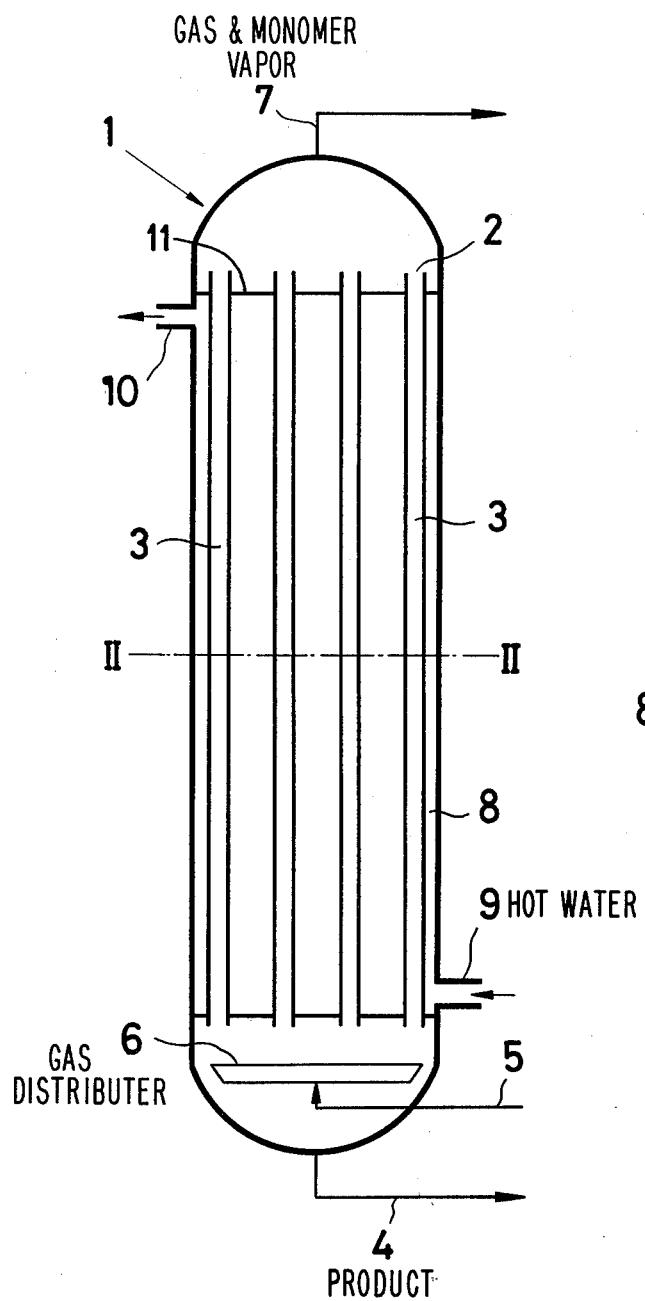
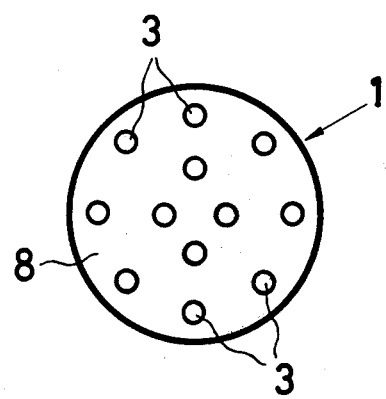

PROCESS FOR TREATING LATICES

This is a continuation-in-part of application Ser. No. 513,522 filed Oct. 10, 1974, now abandoned, which was a continuation of application Ser. No. 207,799, filed Dec. 14, 1971, now abandoned.

BACKGROUND OF THE INVENTION

This invention relates to a process for separating effectively unreacted monomers or solvents from synthetic rubber latex or synthetic resin latex by contacting the latex with an inert gas such as air, nitrogen or helium, etc. in an wetted-wall tower.

Two different methods have generally been used, heretofore, in order to separate monomers from latices. That is to say, a first method is the so-called steam distillation in which steam is blown into a vessel containing latices. This method has, however, a disadvantage such as the latex is degraded as a result of losing its stability and of the forming of coagulating matters owing to a long exposure of the latex to a high temperature. Moreover, it has another defect that the decrease of the solid content of the latex gives rise to trouble, in general, because of the condensation of steam during the processing.

A second method is to subject latices to vacuum distillation. However, this method also has disadvantages in that it takes a long period of time to treat the latex owing to its vigorous foaming in apparatuses, and that it is required to use an apparatus with a much larger capacity in comparison with the amount to be treated owing to deal with a foaming latex. Some anti-foaming agents may be added to the latex in order to remove these defects, but may cause the contamination of the latex in this case. It is another defect of this method that the latex is degraded owing to the formation of drying latex film or of coagulating matters resulting from water being eliminated from the surface of the latex during vacuum distillation.

The two methods described above can be operated by means of both a batch process and a continuous process from viewpoint of the type of apparatus. In case that latices are treated with apparatuses known heretofore, an apparatus for a batch process has disadvantages that the latex is degraded as a result of its long exposure to a higher temperature resulting in lower productivity and efficiency of the apparatus. And apparatuses used for a continuous processing have some defects as follows: since an apparatus for increasing its efficiency gives mechanical shear stress to latices, there forms coagulating matter; apparatus with large capacity is difficult to make; the price of apparatus is high; the shape and structure of apparatus is complex, and the cleaning of apparatus inevitable in case of treating latices is hard to do.

In addition to the above methods, as a method for treating latex, for example, there is a method disclosed in U.S. Pat. No. 3,003,930. According to this method, the latex is treated by feeding it to a stripping tower having a number of plates with special structure disposed inside in alternately oblique directions. However, the plate is merely inclined at an angle of 1 to 45 at most, and the latex therefore does not fall down vertically. Moreover, in this method, there is nothing described with regard to bringing the latex into contact with inert gas. Furthermore, in the portion from line 72 in column 2 to line 6 in column 3 of the patent, it is clearly described that plates having a special structure are used whereby the contact of the vapor (which is not an inert gas but a liquid vapor contained in the latex) flowing upward from the lower part of the tower with the latex can be prevented. That is to say, the contact of the vapor and the latex is rather positively evaded.

In such a method, any liquid incorporated in the latex can not be fully stripped. In fact, in the U.S. Patent, it is described that the latex once treated is heated and recycled again, and that a number of towers are operated under vacuum.

In U.S. Pat. No. 2,514,207, there is disclosed a method in which water and unreacted monomers are removed from the latex by batch operation. In this method, the latex is taken in a reaction vessel with an agitator, and water and unreacted monomers are recovered from the latex by means of stripping, heating and treating under vacuum of its liquid. This method is one of the conventional processes for treating latices heretofore known. However, it makes use of outernal force such as stirring operation, mechanical shear stress acts upon the latex, and the stability of latex is largely destroyed to form coagulating matter. In addition, the operation under vacuum often causes foaming in the vessel, which brings about reduced stripping effects and the difficulty of the operation itself.

In the portion from line 58 in column 2 to line 9 in column 3 of the patent, it is described that the heated latex to be recycled is supplied onto the slinger ring and that a thin film of the latex is formed on the wall surface of the stripper. However, the film, as is clearly described in column 3, line 3, fills the role of washing the walls and preventing the accumulation of any solid matter on them (accumulation seems to be formed by adhesion onto the wall surface of the latex splashed by agitation).

As is mentioned above, a variety of methods to eliminate solvents used and unreacted monomers in the treatment of latices have been widely studied by those skilled in the art. Latices, however, are different from a solution and contain water, solid particles, emulsifiers, solvents and monomers, etc. in definite balanced conditions, therefore when treating latices, there arise such problems as the decrease of the stability of latices, the formation of coagulating material and foaming, etc. Accordingly, an excellent method to solve these problems has been earnestly desired heretofore.

This invention is concerned with providing a superior process to these problems.

SUMMARY OF THE INVENTION

It is, therefore, an object of this invention to provide a process for treating continuously natural or synthetic latices, without degrading the said latices, that is to say, to offer a method for dealing with the said latices at moderate prices and with higher efficiency in order eliminate those disadvantages of the prior art processes mentioned above.

This invention relates to a process for treating latices by contacting with an inert gas in an wetted-wall tower as is described in the following: a process for removing the unreacted raw material monomer from synthesized rubber latices; a process for eliminating the added solvent after the growth and the agglomeration of particles of latex to enlarge the particles in the latex with a solvent (a method to enlarge latex particles with a solvent is described, for example, in Rubber World, July, p 471, 1955); or a process for removing the added solvent used in a method for emulsifying a rubber or resin synthesized by means of other process than emulsion polymerization (a method to form an emulsion with a solvent is stated in Japanese Patent Publication Nos. 35-6888 and No. 40-13662, etc.); or a process for performing simultaneously those which are attained by combining any process described prior to this with each other.

The process according to this invention for removing unreacted monomers or solvents from synthetic rubber latex or synthetic resin latex is characterized by bringing said latex into contact with an inert gas fluid, without imposition of mechanical shear stress, at a temperature ranging from 20° to 100° C by feeding said latex into the upper part of a wetted-wall tower (falling film evaporator), said wetted-wall tower being provided with one or a plurality of circular tubes opened at the both ends and standing vertically, the latex being supplied at the upper end of the tube so as to contact with tube walls, the feed rate of latex being in the range of from 5 to 100 gm/min/cm perimeter, the latex fed being caused to fall down spontaneously by gravity along the tube walls in the state of film, the average thickness of said film being in the range of from 0.2 to 1.2 mm and an inert gas being introduced into said tubes at the lower or upper part of said tubes.

Advantages of the process according to this invention as compared with processes which have been known heretofore, are listed as follows:

1. Operating temperatures are lower as compared with those of steam distillation,
2. No operation taking place with vigorous foaming is required,
3. There are no degradation of latices and no need of addition of antifoaming agents because no foaming occurs,
4. No coagulating matters or no films form, as no local elimination of water takes place,
5. Latices are easily treated without reducing their stability,
6. Scale of apparatuses can be selected at will in proportion to the amount of treatment, and their structure is simple and their price is lower, and
7. Period of time required for processing is not very long and, therefore, latices are not degraded.

According to this invention, there are provided processes which are shown below as (1) to (3):

1. Unreacted monomers are separated from an emulsion obtained at a stage where polymerization steps have been completed in the production of rubbers, resins or latices thereof, butadiene rubber, styrene-butadiene rubber, butadieneacrylonitrile rubber, polyvinyl acetate, polyvinylchloride. ethylene-vinyl acetate copolymer, polystyrene, polychloroprene, etc. by emulsion polymerization,
2. The added hydrocarbon or polar solvent is eliminated therefrom after a hydrocarbon solvent such as butadiene, benzene etc. or a polar solvent such as acetone has been added to a styrene-butadiene rubber, butadiene-acrylonitrile rubber emulsion, etc. in order to swell dispersed rubber particles and the growth and agglomeration of particles of latex has been carried out in accordance with these known methods described above, and
3. The organic solvent used to dissolve the rubber or resin is removed from an emulsion obtained by dispersing such an organic solvent solution as benzene solution of cis-1, 4-polyisoprene rubber, isobutylene-isoprene rubber, polyethylene, ethylene-vinylacetate copolymer, etc. made in a method except emulsion polymerization in water containing a surface active agent.

Note: The term of "latex" or "latices" written in the specification of this invention signifies the emulsion described in (1) to (3) above.

These latices normally contain 10 – 80% by weight of solid matter and 0.1 – 60% by weight of unreacted monomers or solvents. This invention relates to the treatment of such latices.

The invention will now be described with reference to the drawings in which:

FIG. 1 illustrates a wetted wall tower in performance of the invention.

FIG. 2 is a cross-section of the tower taken along line II—II of FIG. 1.

The wetted wall tower 1 comprises a combination of smooth circular tubes 3 opened at both ends thereof. The number of tubes is determined depending upon the treating quantity of latices per unit time, the minimum is one, and said tubes stand straight in the vertical direction. When latices cannot be treated at a desired amount with one unit of the tower, this may be done by making use of more than two units arranged in series. However, in this invention, one unit of the tower usually suffices the full treatment of the latices.

Latices are charged into the wetted-wall tower 1. They are preheated to the treating temperature with a heat exchanger or by circulating hot water or a heating medium to the tower jacket 8 through charging it at hot water inlet 9 and drawing out at drawing outlet 10. The treating temperature is in the range of from 20° to 100° C, preferably from 50° to 95° C. When the treatment of latices at a high temperature seems undesirable judging from their property, it may be carried out at a comparatively lower temperature near ordinary temperature by suitably selecting the flow rate of latices, film thickness and flow rate of inert gas, as described later on. This is another characteristic feature of this invention.

The latices are fed so as to contact with said tube walls. In an embodiment shown in FIG. 1, the upper opening of said tube is positioned at a distance of about 1 – 10 cm above from partition plate 11, and the latex in residence on partition wall 11 overflows and falls down spontaneously along wall surface 2 of tube 3.

Thus, the latices fed flow down in tubes in a uniform thin film 2, and are treated by being contacted with an inert gas flowing in a counter current or cocurrent to the latices. The diameter of tube 3 is varied depending upon the properties of latices to be processed, and it is required to use larger tubes as a greater quantity of monomers is contained therein and the latices to be processed become apt to foam. Generally, a diameter of from 5 to 150 mm is satisfactory. The length of the tube is determined according to the amount of monomers in latices, the properties of latices etc., and is generally suitable in the range of from 2 to 20 m. Further, the flow rate of latices is dissimilar according to the amount of monomers in latices, the properties of them, etc. In general, however, a good result is attained in case that the quantity of latices to be treated per peripheral unit length (cm) of tube is in the range of from 5 gm/min to 100 gm/min.

That is to say, it is in the range of from 5 to 100 gm/min/cm perimeter, preferably from 5 to 60 gm/min/cm perimeter. If it is below the above range, the amount of the monomer and others is decreased greatly, but the tower efficiency is lowered. If it is above the above range, flooding tends to come to pass in case the flow rate of the gas fluid is increased, as is described later.

According to this invention, the film thickness of latex spontaneously falling down along tube walls is in the range of from 0.2 to 1.2 mm, preferably from 0.5 to 1.0 mm. Too thin film causes the decrease of tower efficiency, and too thick film results in an insufficient treatment of the latex. In this invention, as a matter of course, the film thickness is smaller than the tube radius, and there is provided space enough for the passing of inert gas through the tube.

On the other hand, the inert gas fluid is charged into the tower through line 5 in order to be contacted with latices in a counter current, after heating or conditioning of the humidity according to the purpose. At the location 6 in the tower a distributor is placed preferably in order to make the gas fluid flow in each tube 3 uniform. The gas fluid is taken out at the tower top 7, but it may naturally be used in recycle depending upon the operating conditions.

In case the gas fluid is contacted with latices in a cocurrent flow, feed lines of the gas fluid 5 and 6, and take out line 7 in FIG. 1 may be located inversely each other in the tower. When the gas fluid is contacted with latices in a counter current, the removing rate of the monomer and others is faster than that in case of a cocurrent contact, but flooding is apt to occur.

The flow rate of the gas fluid is not limited in particular, although the Reynolds number of fluids in the tower is preferably above 1000.

As an inert gas, air, nitrogen gas, hydrogen gas or helium gas and the like are generally employed.

As a result of an intensive study of the inventors related to the value of equilibrium content of the said monomers, or organic solvents between latex and vapor phase, it has been proved that since the monomer or solvents existing in latices in the state of swelling dispersed particles are not adsorbed so strongly in the dispersed particle and as a result, the equilibrium content rather becomes the same as when the monomer and others are dispersed in water the monomer and others in the latices continue to transfer to the vapor phase until their concentration in the vapor phase reaches to quite a higher value, when monomers or solvents are contacted with inert gases. And also, it has been made clear that the transfer rate of the monomer and others is so slow as to take a long period of time, for example, one to three weeks in order to reach equilibrium state, although the equilibrium value deviates to the vapor phase side provided an ordinary shaped apparatus is used at the ordinary temperature.

Thus, the inventors have made an earnest study in order to increase the transfer rate, and as a result, it has been proved that it depends upon the treating temperature, the fluid state of latices and the film thickness of latices and it has become possible to raise remarkably the transfer rate of the monomer and others by means of contacting latices flowing down in an wetted-wall tower with an inert gas such as air, nitrogen, hydrogen or helium, etc. in a counter current or cocurrent at a temperature of from 20° to 100° C, preferably from 50° to 95° C. If the treating temperature is below 20° C, the efficiency is low owing to the slow transfer rate of the monomer and others, and when above 100° C, the lowering of the stability of latices and the formation of coagulating matter are apt to occur. Hence, the temperature range described above is adequate. The said gas fluid here used may be any gas unless it gives a bad influence on dissolving in latices or unless it reacts with monomers, surface active agents or additives existing in latices. It is preferable to condition the humidity of the gas fluid at the same temperature as that of the latices in the tower in order to prevent the evaporation of water in the latices except for the case mentioned hereafter.

According to this invention, as will be mentioned in the example, even the monomer and others boiling at a higher temperature than the boiling point of water can be separated by making use of the relationship between the vapor pressure and the equilibrium concentration in vapor phase. Further, it has become possible to treat latices without degrading at all, since the residence time in a wetted-wall tower is, in general, quite short and is below one minute ordinarily, and no water but only unreacted monomer evaporation from the latices occurs in the tower as a result of the use of a gas fluid with conditioned humidity.

The above has been described with respect to an wetted-wall tower operated under atmospheric pressure, for whatever purpose it may be used. In spite of it, it is quite possible to perform the process under pressure or vacuum or at different temperatures from the temperature range above in order to treat more availably, from viewpoint of the relationship between the heat stability of latices, the boiling point of the monomer and others or their diffusion rate in the latices phase, etc.

The following examples will serve to illustrate this invention more fully and practically.

EXAMPLE 1

Styrene-butadiene rubber was prepared by using the known method (G. S. Whitby, Synthetic Rubber, John Wiley & Sons, Inc.) in accordance with the so-called Hot Recipe. Thus, a latex having the following composition was obtained. The units used hereinafter are in percent by weight unless otherwise referred to.

| water | 64.4 % |
|---|---|
| styrene-butadiene rubber | 25.0 % |
| soap | 0.5 % |
| additive | 0.3 % |
| unreacted styrene monomer | 5.6 % |
| unreacted butadiene monomer | 4.2 % |

The latex was contacted counter-current with nitrogen gas saturated with water at a temperature of 70° C using an wetted-wall tower of 1. inches in tower inner tube diameter and of 5 m in tower height. The amount of unreacted styrene monomer and butadiene monomer in the latex thus treated was 1.4 and 0.2% respectively under the operating conditions of the flow rate of 2 kg/min of, the latex per tube, the film thickness of latex flowing down, 0.23 mm, and the flow rate of the nitrogen gas per tube, 2 lit./sec. The quantity of the monomers in the latex was determined by the known analytical method [F. M. Nelsen, Analytical Chemistry, 33, 1150 (1951).

EXAMPLE 2

The latex prepared in Example 1 was processed with the same apparatus and under the same conditions as those of Example 1 except that the operating temperature was 90° C. The amount of unreacted styrene monomer obtained thus was 0.5% in the latex, and that of butadiene monomer, 0.1% in the latex. It was proved that there was no foaming of latex, and that the amount of coagulating matter remained to be 0.2 both before and after the processing.

EXAMPLE 3

A highly concentrated butadiene rubber latex was made by using the method written in the reference cited in Example 1 in accordance with the Hot Recipe. The composition of the rubber latex thus produced was as follows:

| | |
|---|---|
| water | 40.0 % |
| butadiene rubber | 55.3 % |
| soap | 2.0 % |
| additive | 0.7 % |
| unreacted butadiene monomer | 2.0 % |

The latex was treated using similar apparatus and under similar conditions to those in Example 1. Thus, the unreacted butadiene monomer was in an amount of 0.1% in the latex. It was found that there was no foaming, and that the quantity of coagulating matter was 0.3 both before and after the processing without formation thereof.

EXAMPLE 4

The latex obtained in Example 3 was streamed down counter-currently and in parallel for contacting for a temperature of 65° C to the nitrogen gas saturated with water using an wetted-wall tower of 3 m in tower weight and of 3 mm in tower inner tube diameter. The running was conducted under the conditions a flow rate of the latex per tube, 0.5 kg/min, the film thickness of latex falling down, 0.5 mm, and a flow rate of the nitrogen gas per tube, 0.5 lit./sec. In this case, the amount of the unreacted butadiene was found to be 0.2 in a counter current flow, and 0.3% in a cocurrent flow. Neither formation of coagulating matter nor foaming was observed. In all of the above examples from 1 to 4, neither evaporation of the water in the latex nor condensing of water into the latex was found.

EXAMPLE 5

The latex obtained in Example 1 was contacted counter-currently with a dry nitrogen gas at a temperature of 90° using an wetted-wall tower of 10 m in tower height and of 1 inch in tower inner tube diameter. The contact run was effected under the conditions of a flow rate of the latex per tube, 1 kg/min., the film thickness of latex falling down, 0.31 mm, and a flow rate of the nitrogen gas per tube, 1.5 lit./sec. The amount of styrene monomer in the latex was found to be 0.2%, and that of butadiene monomer therein, a trace. The quantity of coagulating matters after contact run was 0.2%, and remained unchanged as compared with that before the contact.

EXAMPLE 6

The latex 200 on the market, named by the classification system according to the ASTM D 1420, was agglomerated in its particles by the method described in U.S. pat. No. 2,897,168. After the agglomeration, the benzene utilized was eliminated by processing under the same conditions as those of Example 5 except that nitrogen gas saturated with water was employed. The benzene, of which initial concentration was 60% by weight, was removed almost completely.

EXAMPLE 7

Cis-1,4-polyisoprene rubber on the market was emulsified in accordance with the method described in the Japanese Patent Publication 35-6888, and the rubber emulsion thus formed was treated by the same procedure as that of Example 6. As a result, the benzene with a concentration of 60% by weight could be eliminated almost completely.

COMPARATIVE EXAMPLE 1

The latex made in Example 3 was processed at a temperature of 30° C in a batch of 2 m³ in volume with stirring apparatus under pressure. A vigorous foaming of the latex resulted, and it was observed that the apparent volume of the latex became as large as about fifteen times the initial volume under a pressure of 100 mm Hg.abs. The foam thus formed was impossible to defoam by means of stirring, and the addition of antifoamers was also of a little effect. It was required to raise further the degree of vacuum to 60 mm Hg.abs. in order to lower the amount of the unreacted butadiene monomer to the same degree as that of Example 3. Moreover, it took from 6 to 10 long hours for doing so. In this case, it was also found that about 3% film or coagulating matter to the latex was formed, since water was eliminated locally from the latex.

What is claimed is:

1. A process for removing unreacted monomers or solvents from a latex selected from the group consisting of synthetic rubber latex and synthetic resin latex which comprises bringing said latex into contact with an inert gas fluid, without imposition of any substantial mechanical shear stress, at a temperature ranging from 20° to 100° C by feeding said latex into the upper part of an wetted-wall tower (falling film evaporator), said wetted-wall tower being provided with one or a plurality of circular tubes opened at the both ends and standing vertically, the latex being supplied at the upper end of the tube so as to contact with tube walls, the feed rate of latex being the range of from 5 to 100 gm/min/cm perimeter, the latex fed being caused to flow down spontaneously by gravity along tube walls in the state of film, the average thickness of said film being in the range of from 0.2 to 1.2 mm and an inert gas being introduced into said tubes at the lower or upper part of said tubes.

2. A process as claimed in claim 1 in which said latex is an emulsion containing a polymer selected from the group consisting of butadiene rubber, butadiene-styrene rubber, butadiene-acrylonitrile rubber, polyvinylchloride, polyvinylacetate, ethylene-vinylacetate copolymer, polystyrene and polychloroprene.

3. A process as claimed in claim 1 in which said wetted-wall tower contains a plurality of vertical tubes each tube of which has an inner diameter of from 5 to 150 mm and a tubular length of from 2 to 20 m.

4. A process as claimed in claim 1 in which said inert gas is a member selected from the group consisting of air and nitrogen.

5. A process for removing unreacted monomers from an emulsion obtained at a stage in which polymerization steps have been completed in the production of butadiene rubber, styrene-butadiene rubber, butadiene-acrylonitrile rubber, polyvinyl acetate, polyvinyl chloride, ethylene-vinyl acetate copolymer, polystyrene, polychloroprene and latex thereof by emulsion polymerization which consists essentially of bringing said emulsion into contact with an inert gas fluid, without imposition of any substantial mechanical shear stress, at a temperature ranging from 40° to 100° C by feeding the said latex into the upper part of a wetted-wall tower (falling film evaporator), said wetted-wall tower being provided with one or a plurality of circular tubes opened at the both ends and standing vertically, the latex being supplied at the upper end of the tube so as to contact with tube walls, the feed rate of latex being in the range of from 5 to 100 gm/min/cm perimeter, the latex fed being caused to flow down spontaneously by gravity along tube walls in the state of film, the average thickness of said film being in the range of from 0.2 to 1.2 mm and an inert gas being introduced into said tubes at the lower or upper part of said tubes.

6. A process as claimed in claim 5 in which said wetted-wall tower contains a plurality of vertical tubes each tube of which has an inner diameter of from 5 to 150 mm and a tube length of from 2 to 20 mm.

7. A process as claimed in claim 5 in which said inert gas is a member selected from the group consisting of air and nitrogen.

* * * * *